(No Model.) 2 Sheets—Sheet 1.
P. R. RASMUSSEN.
LAWN MOWER.
No. 538,347. Patented Apr. 30, 1895.
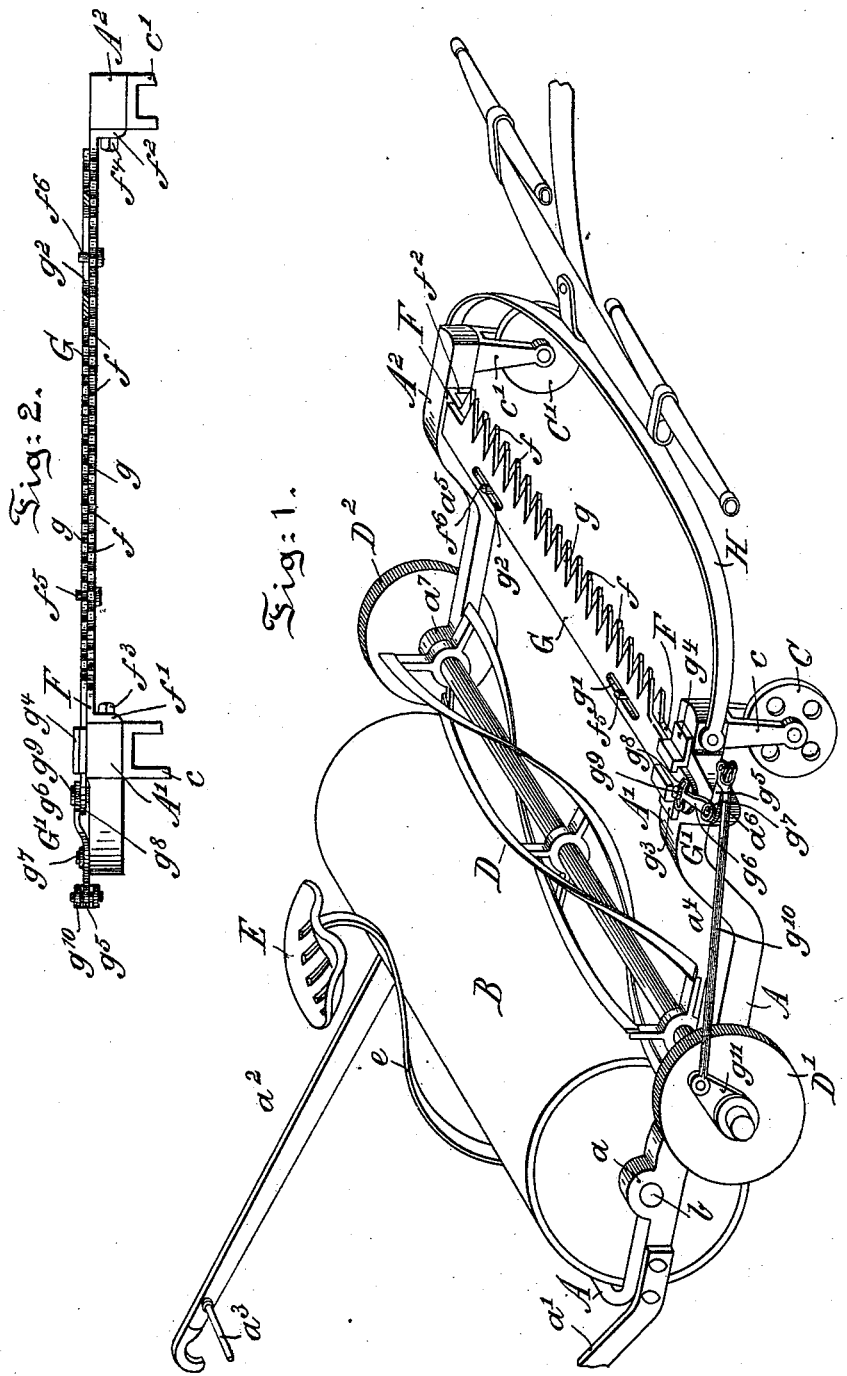
Witnesses:
Richard C. Maxwell
Thomas M. Smith
Inventor:
Peter R. Rasmussen,
By J. Walter Douglass
Attorney

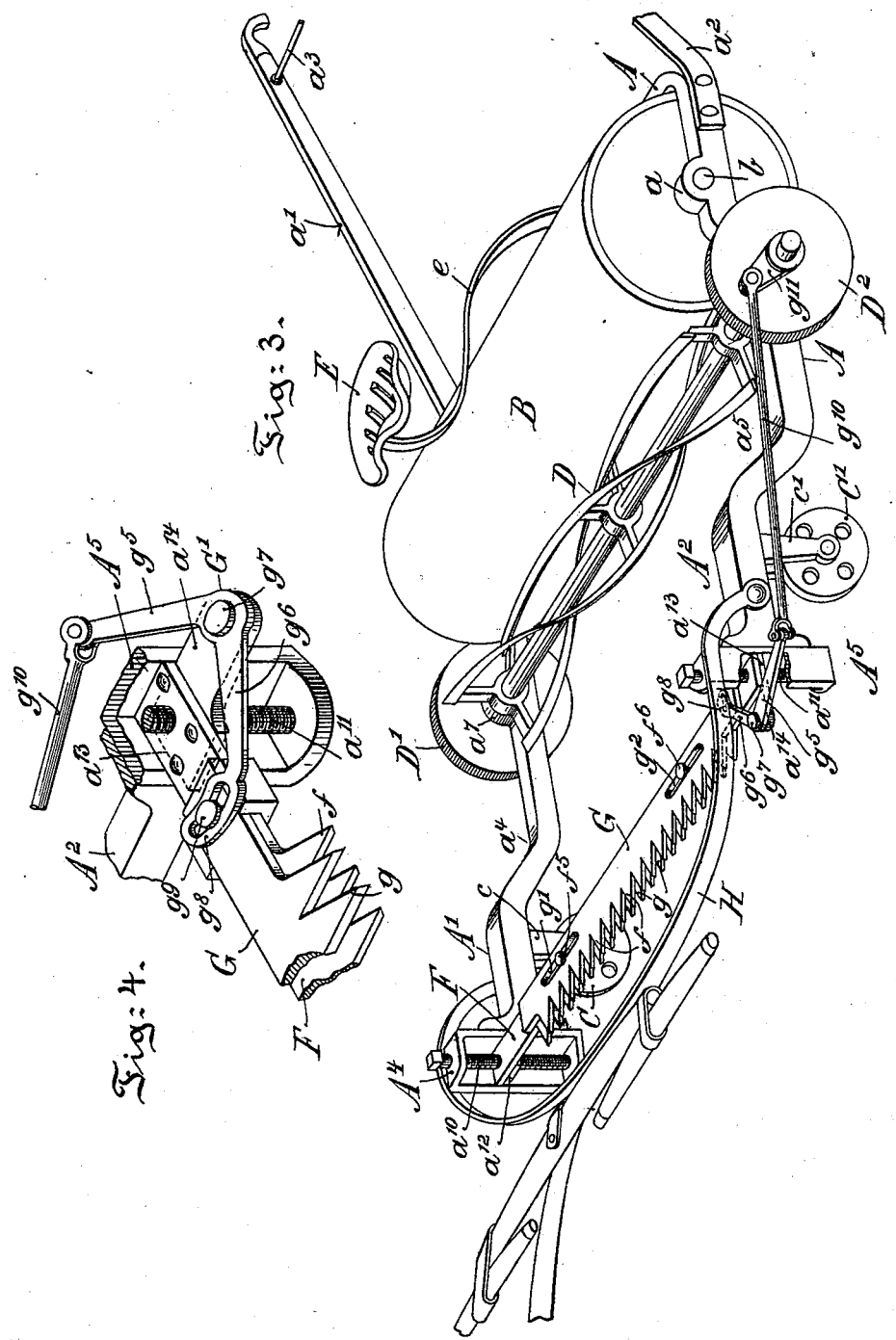

UNITED STATES PATENT OFFICE.

PETER R. RASMUSSEN, OF PHILADELPHIA, PENNSYLVANIA.

LAWN-MOWER.

SPECIFICATION forming part of Letters Patent No. 538,347, dated April 30, 1895.

Application filed June 13, 1894. Serial No. 514,392. (No model.)

*To all whom it may concern:*

Be it known that I, PETER R. RASMUSSEN, a citizen of the United States, residing at Germantown, (Philadelphia,) in the county of Philadelphia and State of Pennsylvania, have invented certain new and useful Improvements in Lawn-Mowers, of which the following is a specification.

My invention has relation to the construction and arrangement of a lawn mower, whereby grass of different heights may be severed or cut in the draft of the machine.

The principal objects of my invention are, first, to provide a comparatively simple, durable and effective lawn mower for cutting grass of different heights in the draft of the machine; second, to provide a lawn mower with a rear rotary cutter cylinder and with a front cutting device having stationary and movable knives arranged in connection with the machine and operating in such manner in the draft of the machine by manual or horse power as to uniformly cut grass of different heights; and third, to provide a lawn mower with a rotary cutter cylinder and with a cutting device having stationary and reciprocating knives and said cutting device adapted to be adjusted in a vertical direction to compensate for varying conditions of the grass and to permit of any growth thereof being cut in the draft of the machine.

My invention consists of the improvements in a lawn mover constructed and arranged in the manner hereinafter described and claimed.

The nature and scope of my invention will be more fully understood from the following description taken in connection with the accompanying drawings forming part hereof, and in which—

Figure 1, is a perspective view of a lawn mower embodying the characteristic features of my invention. Fig. 2, is a detached front view of the stationary and reciprocating knives of the front cutting device of the machine, showing also the bell crank lever adapted to actuate the movable knives of said device. Fig. 3, is a perspective view of a modified form of lawn mower of my invention, showing the front cutting device of the machine having stationary and movable knives and the said device susceptible of vertical adjustment to compensate for different conditions of the grass to be cut in the draft of the machine; and Fig. 4, is a similar view on an enlarged scale and in broken section of the stationary and movable blades of the cutting device of my invention in such a machine, showing the manner of adjusting the said cutting device in the bearers therefor provided in the front ends of the main-frame of the machine.

Referring to the drawings with reference more particularly to Figs. 1 and 2, A is a surrounding or inverted U-shaped frame of the machine, having in the rear on both sides bearings $a$, for the reception of the journals $b$, of an iron or other suitable form of ground roller B.

$a'$ and $a^2$, are projecting handle bars bolted to the sides of the rear portion of the frame A, and which bars are adapted to be connected with each other by means of a cross-rod $a^3$.

The respective arms $A'$ and $A^2$, of the main frame A, are bent upward into a slightly curved form at $a^4$ and $a^5$, and on the outside of one of these arms is formed integral therewith a laterally tapering lug forming a seat $a^6$, for a purpose to be presently explained.

C, and C', are traveler wheels loosely journaled to forked hangers $c$ and $c'$, bolted or otherwise secured to the bottom of the arms $A'$ and $A^2$, of the frame A.

D, is an open spiral cutter cylinder journaled to the main frame A, in bearings $a^7$, on both sides cast therewith and as illustrated in Fig. 1, of the drawings.

E, is a seat for an attendant secured to a curved standard $e$, extending over the ground roller B, and secured at its lower extremity to the frame A, in any preferred manner.

F, is a stationary frame or strip provided with a series of saw-toothed knives $f$, and the respective ends of said frame or strip are provided with depending lugs $f'$ and $f^2$, fitting snugly up against the inner sides of the arms $A'$ and $A^2$, of the inverted U-shaped frame A, and secured thereto by means of bolts $f^3$ and $f^4$, as clearly illustrated in Fig. 2.

G, is a frame or strip provided with a series of saw-toothed knives $g$, and with oblong slots $g'$ and $g^2$ therein.

$f^5$ and $f^6$, are pins projecting from the face of the stationary knife frame or strip F, and extending through the slots $g'$ and $g^2$, of the strip or frame G.

$g^3$ and $g^4$, are Z-shaped plates in cross-section secured to the arm A', and forming guides or ways for the movable knife frame or strip G.

G', is a bell crank lever comprising the members $g^5$ and $g^6$, which are respectively pivoted at $g^7$, to each other and to the seat $a^6$, of the arm A'. One of said members $g^6$, has a slotted eccentric head $g^8$, and engaging therethrough is a stud-pin $g^9$, which is secured into one end of the movable knife frame or strip G, and the member $g^5$, is engaged at its free end by the forked end of a connecting rod $g^{10}$, which latter at its opposite end is pivotally connected to a crank $g^{11}$. This crank $g^{11}$, is rigidly mounted on one of the end journals of the rotary spiral cutter cylinder D, beyond the traction wheels D' and $D^2$ thereof.

H, is the pole for a span of horses with its accessories suitably connected by means of bolts or the like with the respective arms A' and $A^2$, of the main-frame A.

It will be observed that in the draft of the machine by a span of horses, manually or by a single horse, and with the parts arranged as hereinbefore explained, when the front cutting device provided with the stationary and reciprocating knives F and G, is brought into the path or presence of the high grass, the same will by the reciprocations of one of said members of the cutting device sever the blades of grass and thus leave the same in such a condition and at such a height as to permit the spiral cutter cylinder D, to further sever the same as close to the ground as possible, which of course will depend upon the particular location of the rotary cutter cylinder D, above the ground.

The machine illustrated in Figs. 3 and 4 is the same as that hereinbefore described with the following exceptions: The traveler wheels C and C', in the present instance are located a short distance in rear of the front cutting device and the front extremities of the arms A' and $A^2$, of the frame A, are provided with angle boxes $A^4$ and $A^5$, having threaded bolts $a^{10}$ and $a^{11}$, extending therethrough and onto one of which is mounted a nut $a^{12}$, forming a bearing for one of the slotted ends of the stationary knife frame or strip F, which at the opposite end is supported to the bolt $a^{11}$, by a bearer nut $a^{13}$, having a tapering projection forming a seat $a^{14}$, to which the bell crank lever G', having the respective members thereof in pivotal connection with the movable knife frame G, and a connecting rod $g^{10}$, which latter is in pivotal connection with the crank $g^{11}$, secured to the left hand end journal of the rotary open spiral cutter cylinder D. In other respects the machine of Fig. 3, is the same as that of Fig. 1.

It may be here remarked that it is desirable to have the front cutting device arranged so as to be susceptible of a vertical adjustment, in order to adapt the machine to the condition or height of grass to be cut, preliminarily to the action of the rotary cutter cylinder D thereon.

The machine of my invention, is of such construction and arrangement as that under varying conditions of the field or lawn in the least possible time the grass can be severed or cut without the necessity of several trips being made over the same, to bring the field or lawn to the required condition. Moreover, when it becomes necessary to sharpen or grind the members of the front cutting device, as will be observed from Figs. 1 and 3, this may be readily accomplished by removing the reciprocating blade frame G, and then by withdrawing the bolts holding the stationary blade frame F, to required position in the machine consuming but a few moments of time. These members of the said cutting device may be sharpened or ground and then restored to their respective positions in the machine for again permitting of the use thereof.

Having thus described the nature and objects of my invention, what I claim as new, and desire to secure by Letters Patent, is—

1. The combination, of a main-frame, a rear ground roller, an intermediate rotary cutter, a front transverse reciprocating cutting device having guide rollers and means located between said front cutting device and rotary cutter for positively actuating the former in the draft of the machine, substantially as described.

2. The combination, of a main-frame, a rear ground roller, an intermediate rotary cutter and a front transverse reciprocating cutting device, guide-rollers a bell crank mechanism from said front cutting device with the shaft of said rotary cutter and actuated by the draft of the machine, and means for adjusting in a vertical direction said front cutting device in said main-frame, substantially as described.

In testimony whereof I have hereunto set my signature in the presence of two subscribing witnesses.

PETER R. RASMUSSEN.

Witnesses:
  W. F. KANKEL,
  FRANK A. CHAFFEE.